United States Patent
McNamee, III et al.

(10) Patent No.: US 10,019,748 B2
(45) Date of Patent: Jul. 10, 2018

(54) BUILDING INSULATION AUDITING SYSTEM

(71) Applicant: Owens Corning Intellectual Capital, LLC, Toledo, OH (US)

(72) Inventors: Thomas J. McNamee, III, Perrysburg, OH (US); Matthew Nichols, Perrysburg, OH (US); Clarke Berdan, II, Granville, OH (US); Michael Dolinar, Sunbury, CA (US)

(73) Assignee: OWENS CORNING INTELLECTUAL CAPITAL, LLC, Toledo, OH (US)

( * ) Notice: Subject to any disclaimer, the term of this patent is extended or adjusted under 35 U.S.C. 154(b) by 230 days.

(21) Appl. No.: 15/176,434

(22) Filed: Jun. 8, 2016

(65) Prior Publication Data
US 2016/0356733 A1    Dec. 8, 2016

Related U.S. Application Data

(60) Provisional application No. 62/172,506, filed on Jun. 8, 2015.

(51) Int. Cl.
*G01N 25/72*    (2006.01)
*G06Q 30/06*    (2012.01)
(Continued)

(52) U.S. Cl.
CPC .......... *G06Q 30/0631* (2013.01); *E04B 1/74* (2013.01); *G01M 3/002* (2013.01)

(58) Field of Classification Search
None
See application file for complete search history.

(56) References Cited

U.S. PATENT DOCUMENTS

| 7,445,377 B2* | 11/2008 | Lee | G01N 25/72 374/121 |
| 2016/0150976 A1* | 6/2016 | Fang | A61B 5/7282 600/474 |

OTHER PUBLICATIONS

What it Thermal Imaging, The Electromagnetic Spectrum, FLIRONE Personal Thermal Imager by FLIR—See the Heat, printed from the archive.org website, dated at least as early as Feb. 7, 2015., 5 pgs.

(Continued)

*Primary Examiner* — Andre Allen
(74) *Attorney, Agent, or Firm* — Calfee, Halter & Griswold LLP

(57) ABSTRACT

In an exemplary method for evaluating building insulation, first thermal data for a first building location is received at a computing device from a thermal scanning device, the first thermal data including a first leak temperature reading of a first leak path feature at the first building location. Estimated inside and outside temperatures are stored in the computing device, and an environmental temperature deviation between the estimated inside temperature and the estimated outside temperature is determined. A first leak temperature deviation between the first leak temperature reading and the estimated inside temperature is determined. A first temperature deviation ratio of the first leak temperature deviation to the environmental temperature deviation is compared with a predetermined first maximum acceptable inefficiency ratio. A first user notification is provided, identifying the first leak path feature and indicating whether the first temperature deviation ratio is greater than the first maximum acceptable inefficiency ratio.

20 Claims, 13 Drawing Sheets

(51) Int. Cl.
*G01M 3/00* (2006.01)
*E04B 1/74* (2006.01)

(56) References Cited

OTHER PUBLICATIONS

FLIRONE User Manual, 15 pgs., copyright 2014.

\* cited by examiner

BUILDING INSULATION AUDITING SYSTEM

CROSS-REFERENCE TO RELATED APPLICATION

This application claims priority to and all benefit of U.S. Provisional Patent Application Ser. No. 62/172,506, filed on Jun. 8, 2015, for BUILDING INSULATION AUDITING SYSTEM, the entire disclosure of which is fully incorporated herein by reference.

FIELD OF THE INVENTION

The present application relates to systems and methods for conducting and facilitating building insulation audits.

BACKGROUND

There are many reasons for homeowners to improve the energy efficiency of their homes. From a very high level it reduces our impact on climate change, improves of energy security, and reduces the load on the electric grid. At the individual homeowner level it reduces energy costs, can improve home value, and provides insurance against future energy cost increases. However, there are also many reasons homeowners do not improve the energy efficiency of their homes. One barrier to homeowners is the lack of low cost, reliable, and easy to understand information on how their home is performing from an energy use perspective, and what improvements make sense. Homeowners can also hire professionals to conduct an energy audit of their home. However, these inspections are not inexpensive and the results may not agree with actual energy bills or usage.

SUMMARY

According to an exemplary embodiment of the present application, a system for evaluating building insulation includes a thermal scanning device configured to record thermal data for one or more leak path features at one or more building locations and a computing device in communication with the thermal scanning device for receiving the thermal data. The computing device is configured to determine an environmental temperature deviation between an estimated inside temperature and an estimated outside temperature. The computing device, in response to receipt from the thermal scanning device of first thermal data for a first leak path feature at a first building location, determines a first leak temperature deviation between the first leak temperature reading and the current estimated inside temperature. The computing device compares a first temperature deviation ratio of the first leak temperature deviation to the environmental temperature deviation with a predetermined first maximum acceptable inefficiency ratio. The computing device provides a first user notification identifying the first leak path feature and indicating whether the first temperature deviation ratio is greater than the first maximum acceptable inefficiency ratio.

According to another exemplary embodiment of the present application, a method for evaluating building insulation is contemplated. In an exemplary method, first thermal data for a first building location is received at a computing device from a thermal scanning device in communication with the computing device, the first thermal data including a first leak temperature reading of a first leak path feature at the first building location. An estimated inside temperature and an estimated outside temperature are stored in the computing device, and an environmental temperature deviation between the estimated inside temperature and the estimated outside temperature is determined. A first leak temperature deviation between the first leak temperature reading and the estimated inside temperature is determined. A first temperature deviation ratio of the first leak temperature deviation to the environmental temperature deviation is compared with a predetermined first maximum acceptable inefficiency ratio. A first user notification is provided, identifying the first leak path feature and indicating whether the first temperature deviation ratio is greater than the first maximum acceptable inefficiency ratio.

BRIEF DESCRIPTION OF THE DRAWINGS

In the accompanying drawings, which are incorporated in and constitute a part of the specification, embodiments of the invention are illustrated, which, together with the detailed description given below, serve to exemplify principles of the invention.

DESCRIPTION

Figure 1:
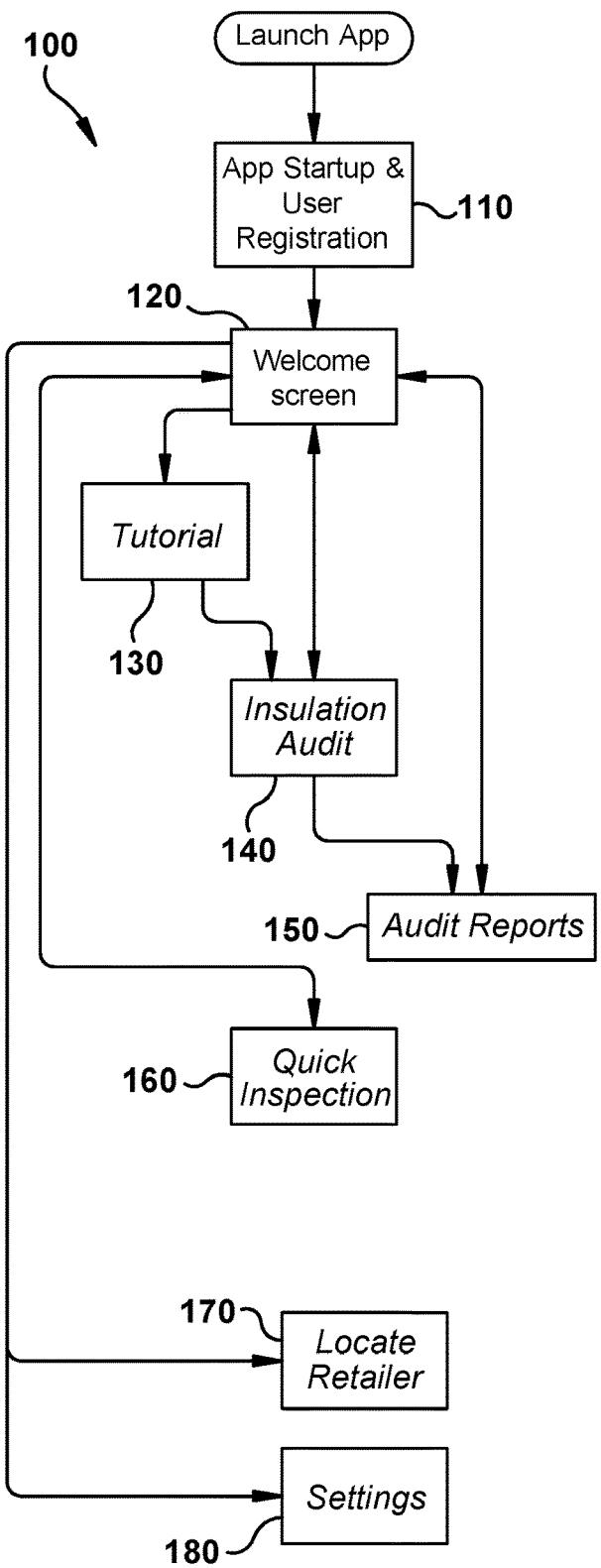
FIG. 1 is a block diagram of an exemplary insulation audit application tool.

Prior to discussing the various embodiments, a review of the definitions of some exemplary terms used throughout the disclosure is appropriate. Both singular and plural forms of all terms fall within each meaning:

"Logic," as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software.

"Software," as used herein, includes but is not limited to one or more computer readable and/or executable instructions that cause a computer or other electronic device to perform functions, actions, and/or behave in a desire manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Browser" as used herein includes, but is not limited to, any computer program used for accessing sites, data or information on a network (as the World Wide Web) including, for example, toolbars and application programs. The browser may be configured to access, download, and/or execute logic and/or software located remote computers. Examples of browsers include Internet Explorer by Microsoft Corp. of Redmond, Wash. and Safari by Apple Corp. of Cupertino, Calif. Other browser programs are also applicable.

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

A professional energy audit often involves use of thermal scanning equipment by a renovation professional, who records thermal images and corresponding thermal gradient readings of exterior walls, floors, ceilings, doors and windows to identify locations having inadequate insulation or other thermal leak paths. The renovation professional reviews the thermal images for visual evidence of temperature deviations that exceed normal tolerances for the building component, and based on the location and the degree of deviation, draws conclusions regarding the cause of the insulation inefficiency (e.g., insufficient or inferior insulation, wall fissures, single pane glass), and makes recommendations to the homeowner (or building manager) regarding repairs, renovations, or other such remediation that should be made to the building components. Exemplary infrared thermal image scanning devices include infrared ("IR") cameras and imaging IR thermometers sold by FLIR Systems, Inc. of Wilsonville, Oreg.

The homeowner or building manager may be reluctant to spend money on an energy audit for which the renovation professional is incented to find insulation efficiency problems requiring additional work by the renovation professional at the expense of the homeowner. The present application contemplates standardized and objective systems and methods for inspecting and evaluating thermal efficiency of existing building components, and for facilitating efficient and cost-effective repair, replacement, or other remediation of building materials to address identified thermal inefficiencies.

Figure 1A:
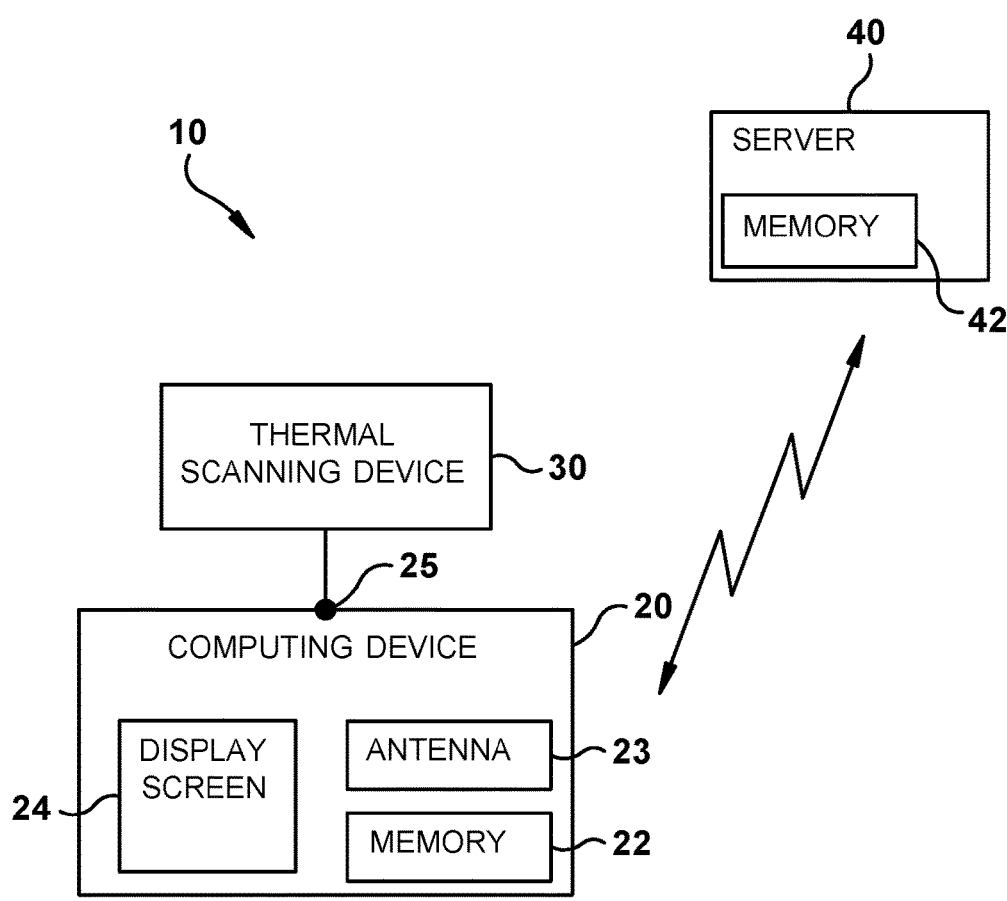
FIG. 1A is a schematic view of a system for evaluating building insulation.

According to an exemplary aspect of the present application, as schematically shown in FIG. 1A, a system 10 for inspecting and evaluating thermal efficiency of existing building components is provided for homeowner do-it-yourself ("DIY") or professional contractor use in an insulation auditing and remediation process. In one embodiment, the system includes a computing device 20 (e.g., desktop or laptop computer, tablet, or smart phone) configured to communicate directly with a thermal scanning device 30, such that thermal scanning data recorded by the thermal scanning device is communicated to the computing device 20 for use (e.g., by a program or application) in identifying, diagnosing, prioritizing, and/or suggesting corrective steps to address the thermal inefficiencies (e.g., thermal leak paths) within a building. The auditing application tool may be stored entirely on the computing device 20 (e.g., in a memory 22), entirely at a remote server 40 accessible through an antenna 23 of the computing device 20 (e.g., using a web-based application to access a memory 42 of a remote server 40), or with portions of the application stored in the computing device memory 22 and portions of the application accessible at the remote server. In an exemplary embodiment, an auditing application tool is stored entirely on the computing device (e.g., to allow for use of the application without an internet connection), and the computing device is configured to periodically (e.g., once per day, once per week) communicate with a remote server to check for updated information to download onto the computing device (e.g., updated information regarding product availability and costs, or updates to the application functionality).

The results of the audit analysis may be provided to the user on a display screen 24 of the computing device 20, and/or as a data output (e.g., audit report) to a remote device (e.g., e-mail to a user or administrator) to be stored and/or printed.

In one such embodiment, the system may include a program or application stored on or accessible by a mobile device (e.g., tablet or smart phone) configured to receive and process thermal scanning data from a thermal scanning device. While communication between the thermal scanning device and the mobile device may be provided by a transient wired (e.g., cabled) or wireless (e.g., radio frequency, Bluetooth, NFC) connection between the thermal scanning device and the mobile device, in another embodiment, the thermal scanning device and the mobile device may be attached, assembled, integral, or otherwise integrated such that a single device is used to perform thermal scanning, evaluate the scanning results, and review results and recommendations for remediation. In one such embodiment, the thermal scanning device 30 is attachable to a data port 25 (e.g., USB port, lightning port) of the computing device 20 for use as a single device. The FLIR One® personal thermal imager by FLIR Systems, Inc. of Wilsonville, Oreg. is one example of a thermal scanning device that attaches to a smart phone for use as a single device.

In an exemplary embodiment, a thermal insulation analysis application tool (e.g., a stored software tool or web-based tool) guides a user through performance of an insulation audit using a thermal scanning device in communication with a computing device having a user interface for guiding the user through the insulation audit process and for reviewing the results of the analysis. In addition to identifying thermal inefficiencies in a home or other building, the application tool may be configured to perform one or more of: teaching users to perform an effective insulation audit; providing step-by-step prompts for thermal scanning of various locations in the building, and entry of additional information for classifying or characterizing the scanned data; compiling an audit report of thermal leak paths or problem areas in the building; facilitating sharing of scanned thermal images and/or associated data on social media websites; recommending insulation material or other building material products to address thermal inefficiencies and/or enhance thermal efficiency of the building; providing quantity estimates for insulation or other building material products; providing cost estimates for building material products based on the user's local market; directing users to nearby retail outlets stocking the recommended products; providing installation instructions for the recommended building material products; providing area sales manager or professional contractor contact information based on the user's location; reporting (e.g., to an application administrator) application usage data, including geographically specific data. At least some of these functions may be performed with or without an internet connection (e.g., WiFi or cellular service).

For an accurate determination of insulation efficiency, information regarding the building inside temperature and the local outside temperature may be required. The inside temperature may be automatically estimated or measured using the thermal scanning device, and may, for example, be calculated as an average temperature of one or more of the thermal images recorded by the thermal scanning device. Alternatively, the inside temperature may be measured or estimated by communication with another temperature sensing device, such as, for example, an electronic thermometer or building thermostat (which may be in wired or wireless communication with the computing device). In still other applications, the estimated inside temperature may be manually entered by the user, for example, as read from an inside thermometer.

Where the computing device has access to an internet connection, the application tool may use the computing device's GPS, cellular, of WiFi-estimated location (or other such locating means) and an online weather service to determine outside temperature for the location. If the computing device is temporarily or permanently without an internet connection, the user may be prompted for manual entry of the outside temperature, for example, as obtained from an outside thermometer or a local weather service.

While performing the thermal scan, the user will have the opportunity to capture thermal images for an audit report. The application tool may also be configured to encourage and facilitate the sharing of these images on a social media website.

The exemplary application tool is configured to compile results of a thermal scan in an audit report when the audit report option is selected from the menu screen (block 140 of FIGS. 1, 5A, and 5B, as discussed below). This report may provide access to information that the user needs to select specific remediation projects, and to purchase any supplies necessary for the selected projects.

When the insulation audit thermal scanning has been completed, the application tool generates an entry on the audit report for each identified problem area or thermal leak path (based on highlighted thermal deviations determined to exceed allowable tolerances). Each entry may be configured to include a thermal image, temperature data, recommended insulation or other building materials product, estimated product quantities, estimated product cost (e.g., based on regional pricing as determined from user location data and online regional pricing data), and a link to installation instructions (e.g., stored in the application tool software or accessed online). The audit report may additionally include contact information for the nearest known or authorized location stocking the recommended building materials products, and/or contact information for the nearest building materials product sales manager.

The application tool may include a built-in cost estimator, which may be accessible during the thermal scan, or from a link in the audit report. The user may be provided with the option of estimating quantity as well as cost to provide a total price estimate, or a unit price if quantity is not estimated. The cost estimator may be configured to look up the current market price for each building materials product from a database, with the local market being identified from the mobile device's estimated location. The database may be an internal database stored in the computing device updated regularly by pricing data provided by the building material product manufacturer(s). Alternatively, the database may be a web accessible database accessed by the computing device using an internet connection.

To monitor usage of the application tool, for example, to identify opportunities for improvement in the application tool, the application tool may be configured to report metrics relating to usage of the application tool, including, for example, geographic usage data, frequency of use (per user), room names being used during audits or other information being manually submitted, and click-through data being provided to manufacturer and/or retailer websites.

The application tool may provide the user with the option of sharing any thermal images captured or displayed from the insulation audit on a social media website, such as, for example, Facebook®, Instagram®, and Twitter®, provided the user has an account set up with the website through his or her mobile device. These shared images may be provided with a watermark of the application tool provider logo or other source information as a form of advertising of the service. The sharing of images to the social media website may additionally provide the user with an opportunity to endorse the application tool provider (e.g., "like" on Facebook®).

FIG. 1 illustrates an overview of an insulation auditing application tool, as may be utilized through prompts on a touch screen or other user interface of a mobile device or other such computing device. As discussed in greater detail below and shown in the diagrams of FIGS. 2-9, the exemplary auditing application tool 100 includes an application startup and user registration module 110, a welcome screen menu 120, a tutorial module 130, an insulation audit module 140, an audit report generating module 150, a quick inspection module 160, a locate retailer module 170, and a settings module 180.

Figure 2A:
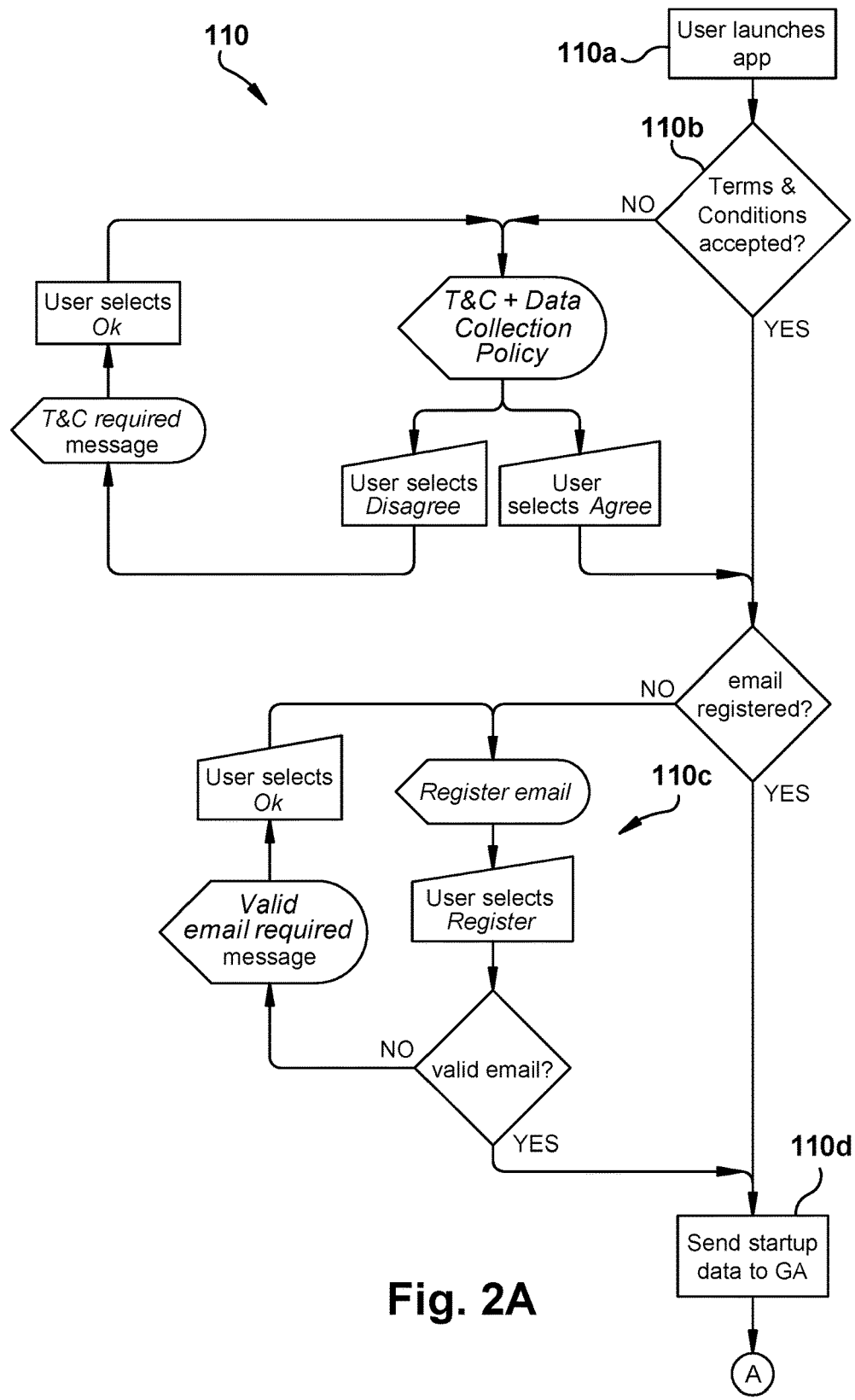
FIGS. 2A and 2B are first and second parts of a flow diagram of an exemplary application startup and user registration module for the insulation audit application tool of FIG. 1.
Figure 2B:
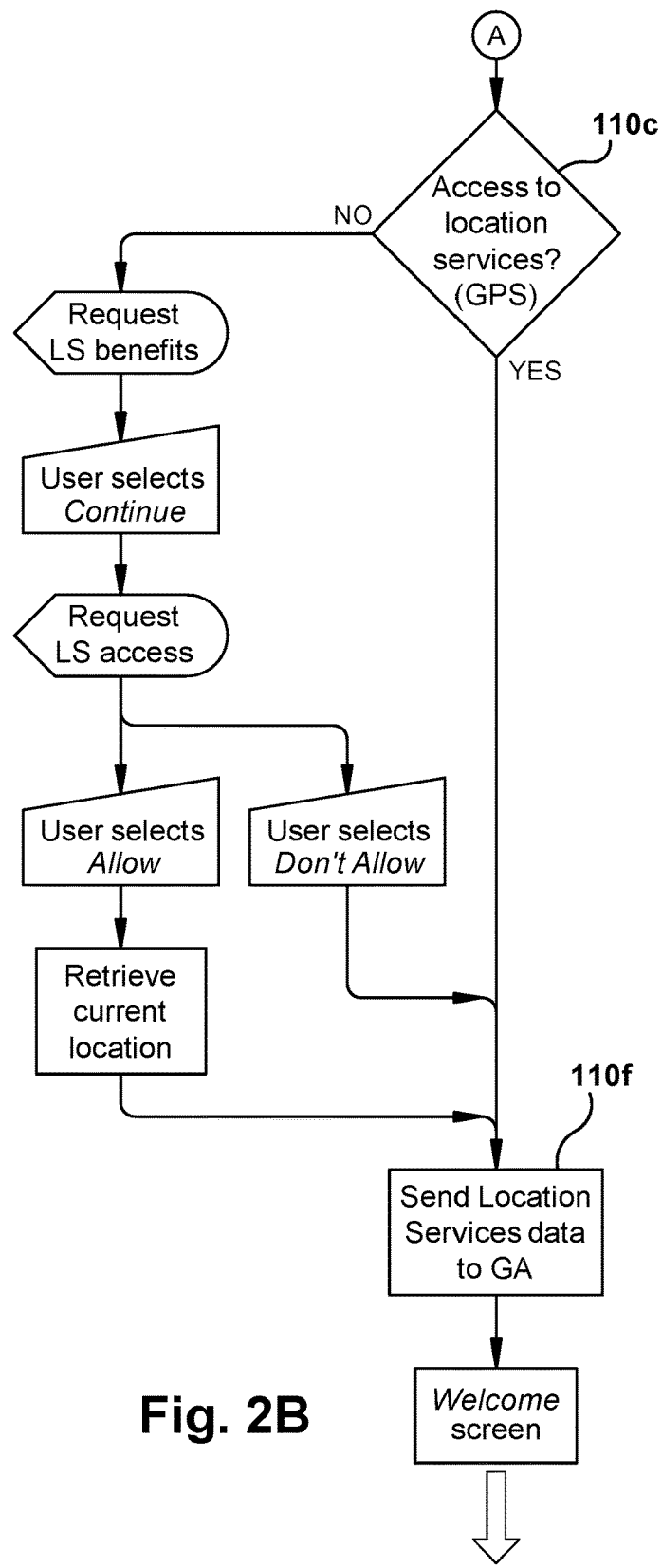

Application Startup and User Registration:

FIGS. 2A and 2B illustrate the steps employed by an exemplary application startup and user registration module 110. In response to a user launch of the application tool at 110a (e.g., selection of icon on mobile device touchscreen), the user is presented with a terms and conditions screen 110b, and an option to accept or decline the terms and conditions. Acceptance of these terms and conditions may be required prior to proceeding with use of the application tool. If the terms and conditions are accepted, registration of the user's e-mail (or verification of prior registration) is performed at 110c. Upon completion of user e-mail registration, registration startup data may be provided to a web analytics service (e.g., Google Analytics®), at 110d, supplying user e-mail, application launch date and time, and whether user interaction and user help are required. A request for access to GPS or other location services may then be made, at 110e. If allowed by the user, location services data may be sent to the web analytics service, at 110f. Once this information is transmitted, the application tool may display the welcome screen and menu 120.

Figure 3:
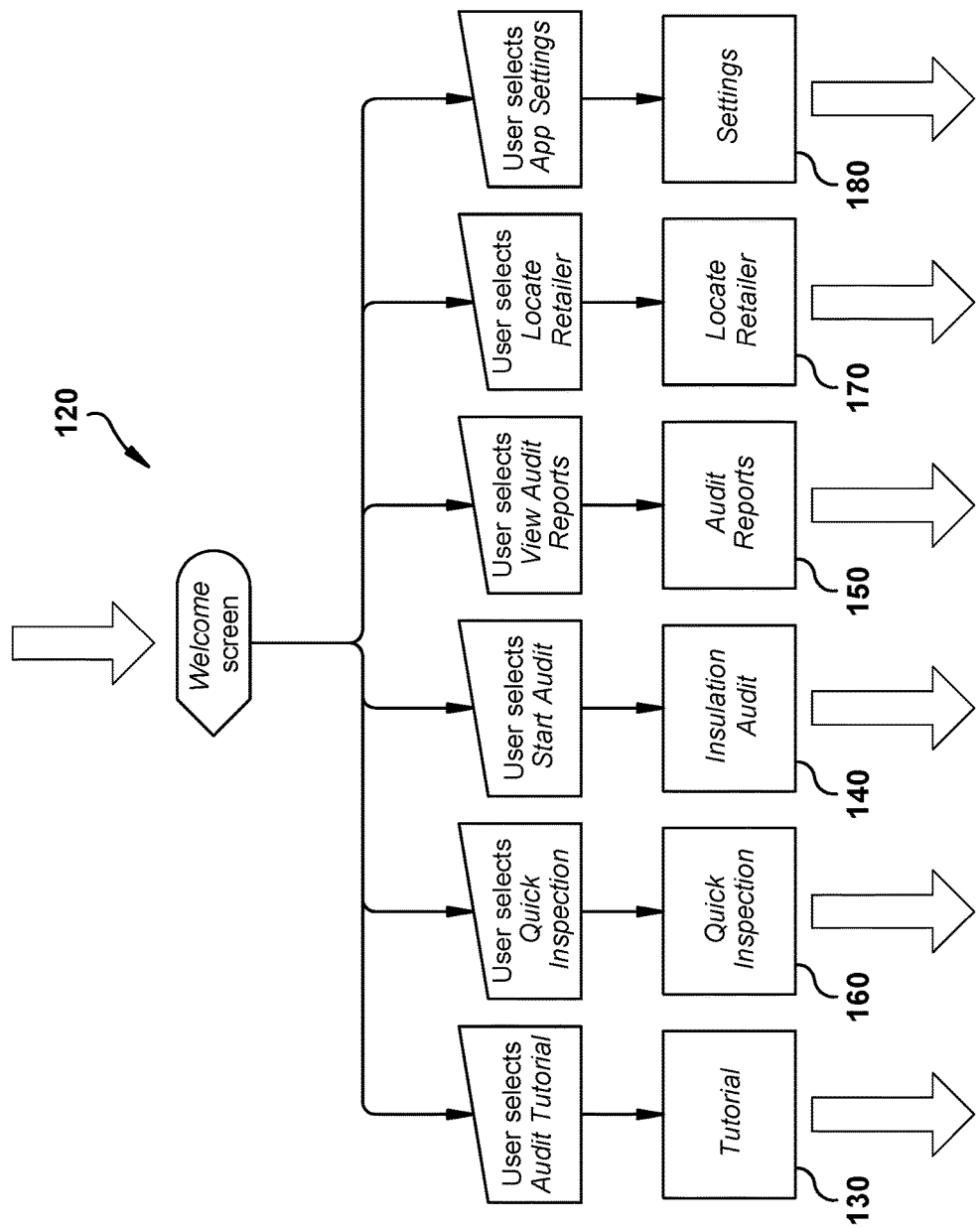
FIG. 3 is a flow diagram of an exemplary welcome screen module for the insulation audit application tool of FIG. 1.

Welcome Screen/Menu:

As shown in FIG. 3, the welcome screen/menu 120 may present multiple options for the user, including, for example, the audit tutorial module 130, the insulation audit module 140, the audit report generating module 150, the quick inspection module 160, the retailer/pricing module 170, and the settings module 180.

Tutorial:

In the tutorial module of the exemplary application tool, a new user may follow brief step-by-step instructions on how to perform an effective insulation audit. The tutorial may be based on insulation audit best practices, and may be appended with app-specific instructions. The tutorial may be presented in a series of touch-screen swipeable pages, with each page including easy to understand illustrations supplemented with simple text instructions.

Figure 4:
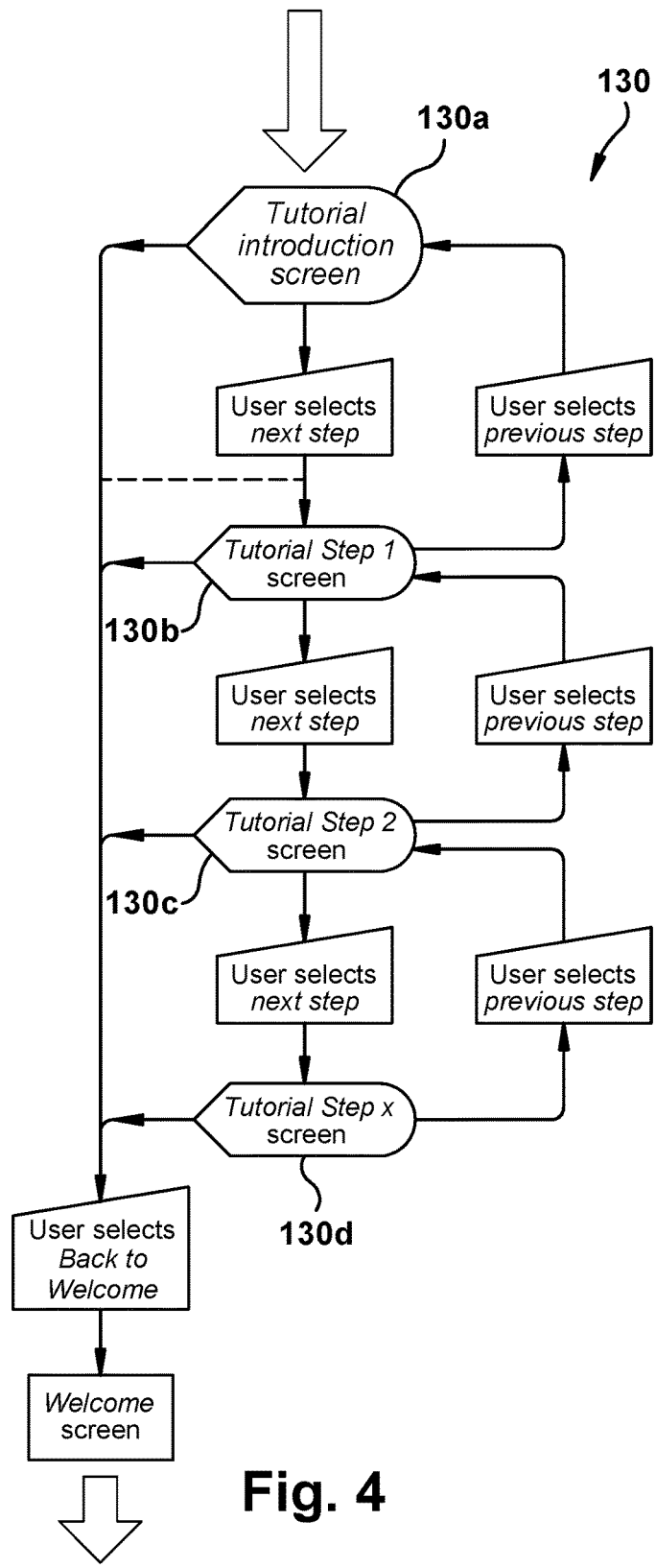
FIG. 4 is a flow diagram of an exemplary tutorial screen module for the insulation audit application tool of FIG. 1.

In an exemplary tutorial module that may provided by the application tool, as shown in FIG. 4, a tutorial introduction screen, at 130a, may describe the learning process required to perform a successful building audit. When read and understood, the user may select the next step (e.g., by selecting a touchscreen button/icon or swiping to the next screen), which graphically and/or textually describes a first step in performing the insulation audit, at 130b. When read and understood, the user may select and view the next step, at 130c, in a similar manner. The opportunity to go back to a previous step screen (e.g., by touchscreen button or swiping) may also be provided. This may continue until a final step, at 130d, is displayed, at which point the user may select (e.g., by touchscreen button) to return to the welcome screen 120.

Figure 5A:
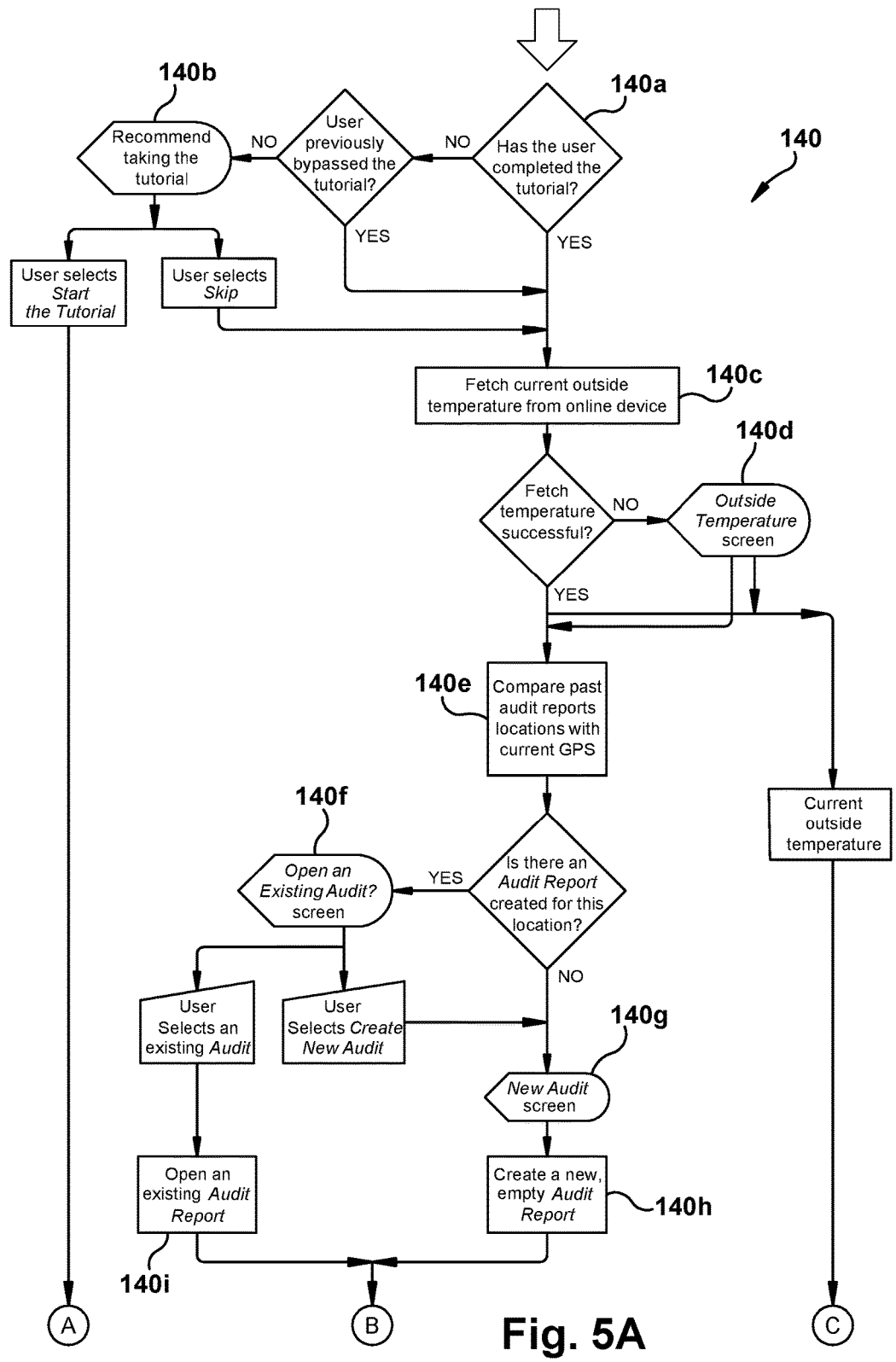
FIGS. 5A and 5B are first and second parts of a flow diagram of an exemplary insulation audit module for the insulation audit application tool of FIG. 1.
Figure 5B:
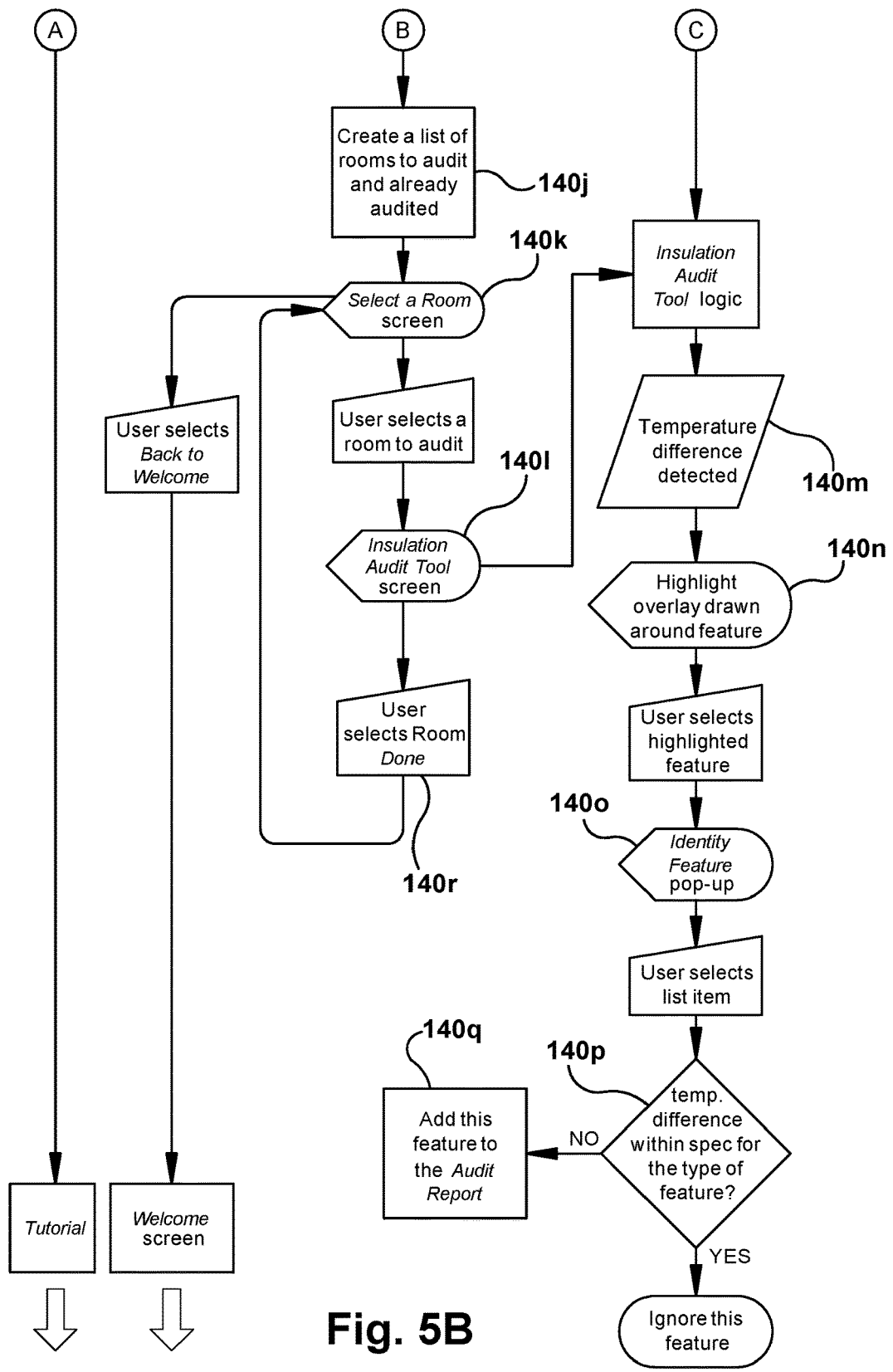

Insulation Audit:

FIGS. 5A and 5B illustrate the steps employed by an exemplary insulation audit module 140. When the insulation audit is selected from the welcome screen menu, the application tool may make a determination of whether the user has completed the tutorial, at 140a. If the tutorial has not been completed, and has not been intentionally skipped before, a recommendation of taking the tutorial may be presented to the user, at 140b.

Prior to prompting the user to perform thermal scanning, the application tool attempts to obtain current outside temperature information from an online service (e.g., Wunderground®), at 140c. If this attempt is not successful (e.g., due to no internet connection), the application tool presents an outside temperature screen, at 140d, prompting the user to manually enter the outside temperature. The application tool then compares past audit reports with the current GPS location, at 140e. If there is already an audit report created for the location, the application tool provides the user with the option, at 140f, of opening an existing audit or creating a new audit. If the user elects to create a new audit, or if there is no existing audit, the new audit screen, at 140g, allows the user to name the new audit, and the application tool opens a new, empty audit report, at 140h. If the user selects an existing audit report, the selected audit report is opened, at 140i.

For the opened audit report, a list of building locations or rooms to audit (and already audited, if applicable) is created, at 140j. The application tool then displays a "select a room" screen, at 140k, allowing the user to select a room to audit. An insulation audit tool screen, at 140l, is then displayed, and works in conjunction with the insulation audit logic to detect temperature differences which may represent an insulation leak. The application tool may be configured to guide the user through a thermal scanning procedure, through displays and prompts on the interface of the mobile device. Upon the initiation of the room scan, the user will pan across a room's floor, ceiling and walls with the thermal scanning device. The resulting thermal data is received by the computing device for analysis.

As discussed above, the thermal data may be used to estimate an inside temperature for the building or a portion of the building (e.g., a room in the building). The application tool may be configured to compare the estimated inside temperature to the estimated outside temperature to determine if a difference between the inside and outside temperature (the "environmental temperature deviation") is sufficient to provide a meaningful measure of thermal leakage or insulation inefficiency, as conditions in which the environmental temperature deviation is minimal may fail to produce identifiable temperature deviations attributable to thermal leakage. As such, the environmental temperature deviation may be compared to a predetermined threshold below which identification of meaningful thermal leakage is less likely. In one example, this predetermined threshold may be based on the thermal measurement resolution and the minimum thermal leak path temperature deviation (as a fraction of the inside-outside temperature differential) considered to be unsatisfactory. For example, the predetermined threshold may be equal to the thermal measurement resolution divided by the minimum thermal leak path temperature deviation. As one example, a thermal scanning device having a thermal measurement resolution of 1° F., used in evaluating a leak path for which a minimum thermal leak path temperature deviation is 15%, would be 1° F./0.15=6.67° F., or about 7° F. If the inside/outside temperature differential is determined to be less than 7° F., the application tool may be configured to alert the user that the inside/outside temperature differential may be too small to provide a meaningful audit. The application tool may be configured to discontinue the audit, and/or to allow the user to proceed with the audit despite the alert.

While panning across a room's floor, ceiling and/or walls with the thermal scanning device, the application tool will detect, at 140m, temperature readings that may indicate an excessive thermal leak or insulation inefficiency at a leak path feature (e.g., window, door, wall, or ceiling). The application tool may then highlight (e.g., on the touchscreen interface) these temperature anomalies or deviations (e.g., hot spots in warmer climates, cold spots in cooler climates), at 140n. The application tool may allow the user to tap any highlighted areas, and prompt the user to provide more information about the highlighted leak path feature (e.g., identification of a doorway, window, etc.), at 140o, either by manually entering a description of the feature, or by selecting the feature from a list. The application tool, at 140*p*, calculates the difference between the leak temperature reading and the estimated inside temperature (the "leak temperature deviation") and determines if the leak temperature deviation is within an allowable tolerance (e.g., as identified from a look-up table, and/or calculated as described below) or specification for the type of feature selected. If the leak temperature deviation is outside of the identified tolerance, the feature is added to the audit report with a notification of the thermal leak condition, at 140*q*. If the deviation is within the identified tolerance, the feature may (but need not) be omitted from the audit report. A user notification identifying the leak path feature and indicating whether the temperature deviation ratio is greater than the maximum acceptable inefficiency ratio may additionally or alternatively be displayed on the computing device (e.g., on the touch screen of a smart phone or tablet).

An allowable temperature deviation for a leak path feature may be specific to or dependent on the type of leak path feature, for example, based on standard thermal efficiencies for a well insulated embodiment of that type of building feature. Building features that typically exhibit higher thermal "leakage" (e.g., windows) may be assigned a larger allowable temperature deviation or thermal inefficiency, while building features that typically exhibit lower thermal "leakage" (e.g., exterior walls) may be assigned a smaller allowable temperature deviation or thermal inefficiency. For example, the allowable temperature deviation for an exterior window may be established as approximately 50% of the environmental temperature deviation, while the allowable temperature deviation for an exterior wall or ceiling may be established as approximately 15% of the environmental temperature deviation. These thresholds may be adjustable as appropriate.

When all of the relevant leak path features of a room have been scanned and identified, the user may complete the audit of that room by selecting a "room done" prompt on the device interface, at 140*r*. The application tool may then display the "select a room" screen 140*k* again, allowing the user to repeat the steps for a new room in the building. If all of the rooms have been audited, the user may select a "back to welcome" prompt and return to the welcome screen/menu 120.

Figure 6:
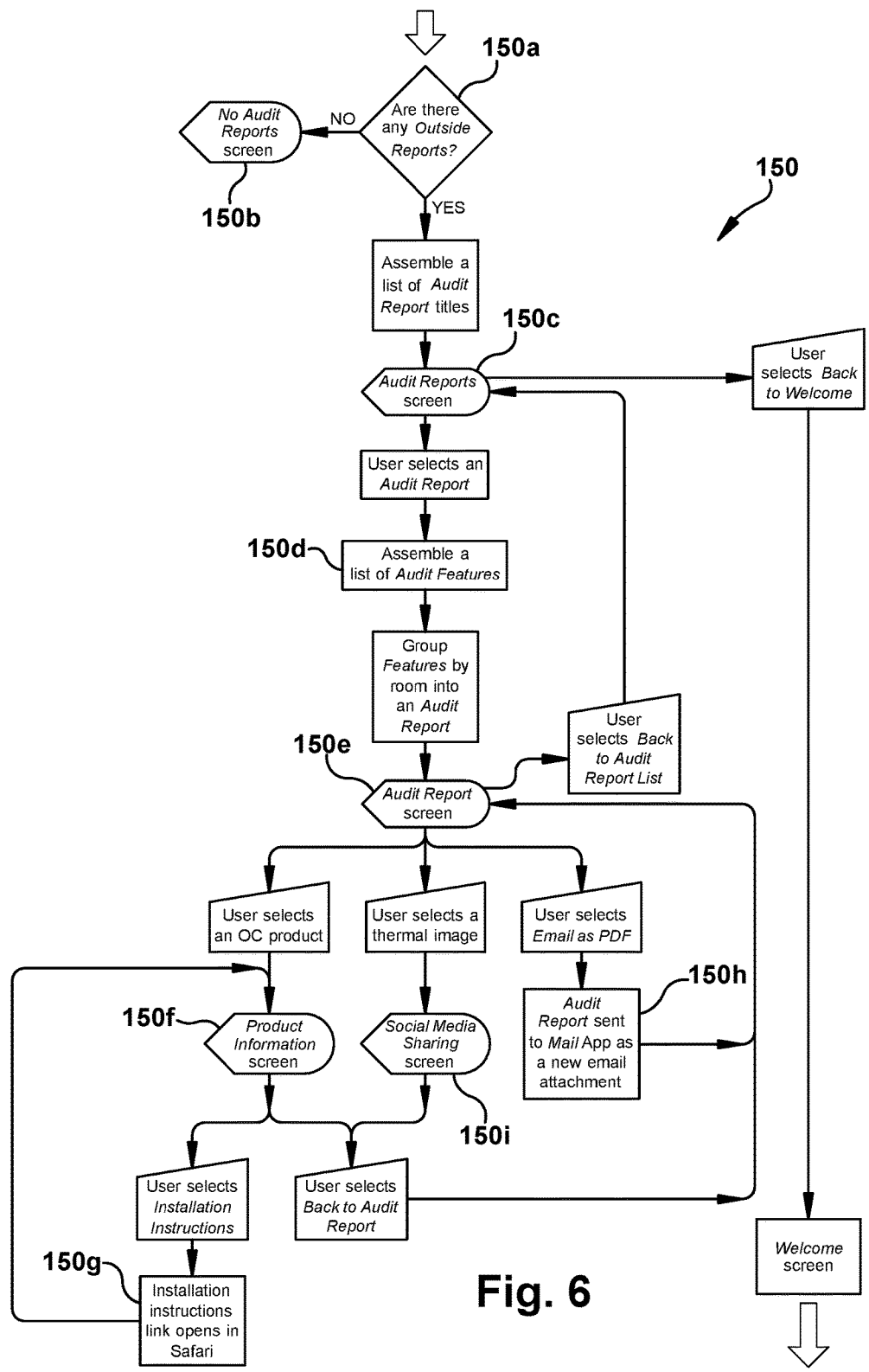
FIG. 6 is a flow diagram of an exemplary audit report module for the insulation audit application tool of FIG. 1.

Audit Reports:

When an audit of the home or other building has been completed, the user may select the view audit reports option on the welcome screen to utilize the audit report generating module 150. FIG. 6 illustrates the steps employed by an exemplary audit report generating module 150. When the view audit reports option is selected from the welcome screen menu, the application tool may make a determination of whether there are audit reports available for viewing, at 150*a*. If no audits have been completed, the user may be notified on a "no audit reports" screen, at 150*b*, that audit reports will be managed through this prompt once the user begins an audit. If audit reports are available or producible, a list of available audit reports is assembled and displayed on an audit reports screen, at 150*c*. From the audit reports screen, the user may select audit report, by title. In response to the selection of an audit report, the application tool assembles a list of audit features identified during the corresponding audit, at 150*d*. The audit features may include, for example, a thermal image, temperature gradient information, description of the insulation deficiency, description of the recommended remediation, level of difficulty of any necessary remediation, an insulation product or other building materials product that may be used to remedy the problem, and the local price and availability of such a product. The recommended building materials product or remediation, difficulty of the project, and impact of the project associated with the feature type and the climate zone of the location may be accessed from a look-up table in a database or spreadsheet including recommended remediations associated with different types of insulation leakage and for different climate zones.

The audit features may be grouped by room in an audit report. Alternatively, the features may grouped by importance, cost effectiveness of the remediation, or types of problems (e.g., windows, doorways, wall insulation, roofing insulation, etc.). The complete audit report may be displayed on an audit report screen, at 150*e*. While the report may be provided as a non-interactive document, in other embodiments, the audit report may be interactive, allowing the user to select (e.g., by touchscreen prompts), at 150*f*, a recommended building materials product to obtain information about pricing, product details, retailer information, or quantity estimation. A link to installation instructions for the selected product may also be provided, at 150*g*. The audit report screen may also allow the user, at 150*h*, to generate a copy of the audit report (e.g., an Acrobat PDF copy), for example, to print or to e-mail as an attachment. The option to select thermal images for social media sharing, at 150*i*, may also be provided. When the user is finished viewing or utilizing the audit report, the user may select a prompt to return to the audit report list. When the user is finished with all available audit reports, the user may select a prompt to return to the welcome screen 120.

Figure 7:
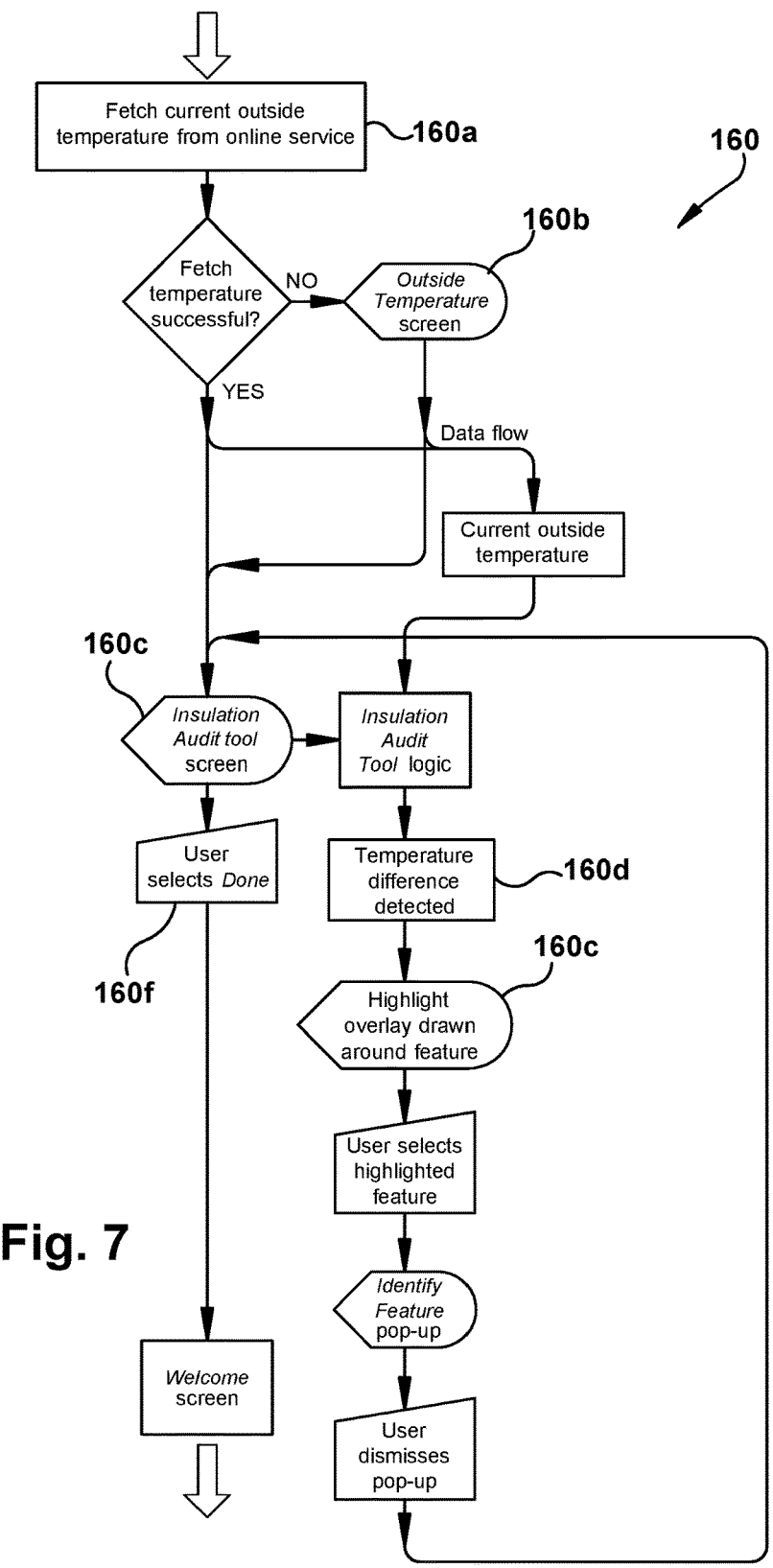
FIG. 7 is a flow diagram of an exemplary quick inspection module for the insulation audit application tool of FIG. 1.

Quick Inspection:

If a user does not want a full audit report but is interested in identifying potential insulation leaks, the user may select the quick inspection module 160 from the welcome screen menu. FIG. 7 illustrates the steps employed by an exemplary quick inspection module 160. Prior to prompting the user to perform thermal scanning, the application tool attempts to obtain current outside temperature information from an online service (e.g., Wunderground®), at 160*a*. If this attempt is not successful (e.g., due to no internet connection), the application tool presents an outside temperature screen, at 160*b*, prompting the user to manually enter the outside temperature.

An insulation audit tool screen, at 160*c*, is then displayed, and works in conjunction with the insulation audit logic to detect temperature differences which may represent an insulation leak. The application tool may be configured to guide the user through a thermal scanning procedure, through displays and prompts on the interface of the mobile device. Upon the initiation of the room scan, the user will pan across a room's floor, ceiling and walls with the thermal scanning device. While panning, the application tool will detect, at 160*d*, temperature differences that may indicate a leak. The application tool will then highlight (on the touchscreen interface) these temperature anomalies (e.g., hot spots in warmer climates, cold spots in cooler climates), at 160*e*. When all of the relevant features have been scanned and identified, the user may complete the inspection by selecting a "done" prompt on the device interface, at 160*f*, and the application tool may then display the welcome screen 120.

Figure 8:
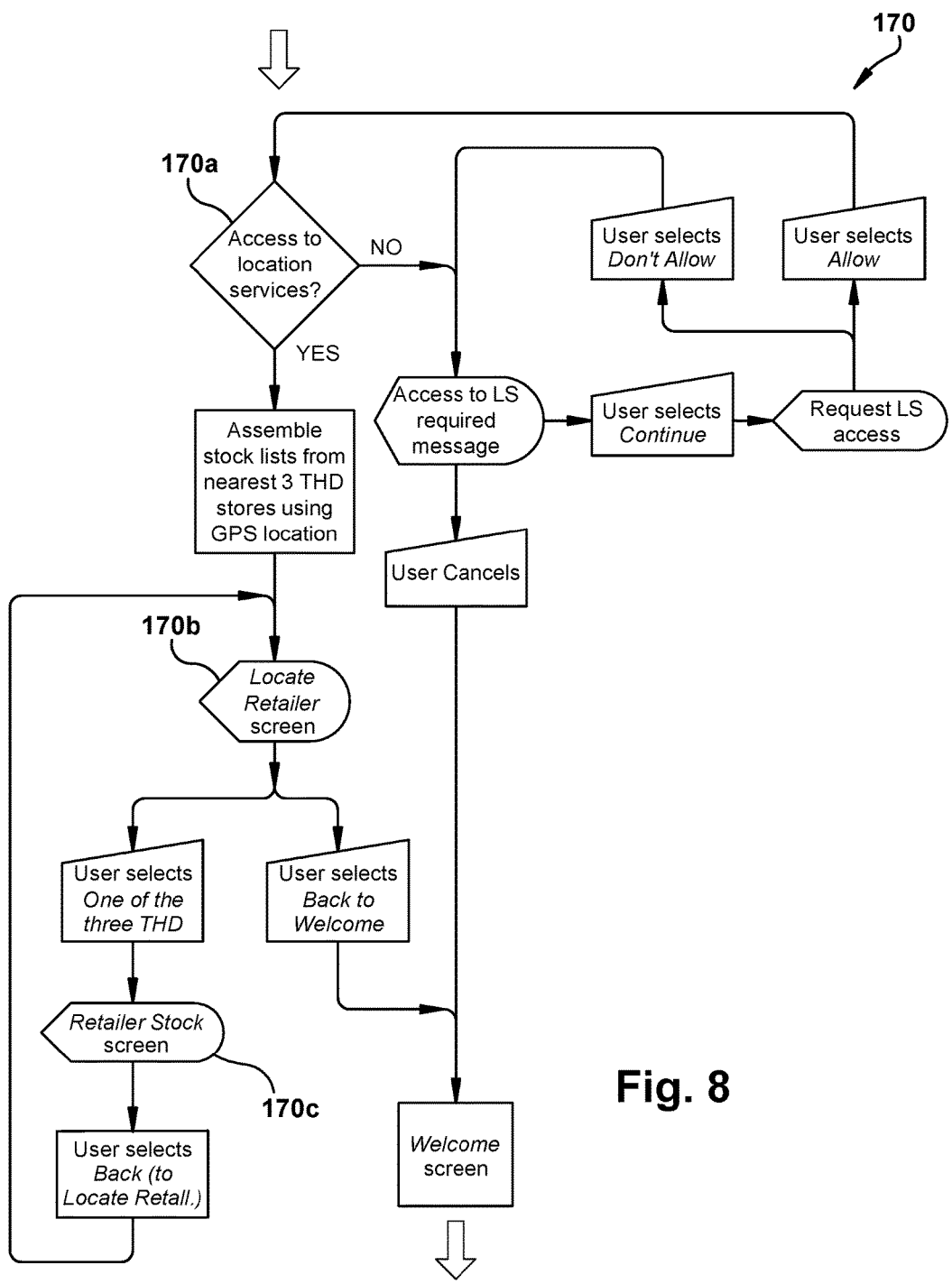
FIG. 8 is a flow diagram of an exemplary locate retailer module for the insulation audit application tool of FIG. 1.

Locate Retailer:

FIG. 8 illustrates the steps employed by an exemplary locate retailer module 170. When the locate retailer option is selected from the welcome screen menu 120, a request for access to GPS or other location services is made, at 170*a*. If allowed by the user, location services data may be used to access and assemble stock lists from the nearest retailers (e.g., the three nearest stores) to the detected location, at 170*b*. These nearest retailers may be listed on the mobile device interface for selection by the user. Upon user selection of a retailer, the store's relevant building materials product stock (e.g., building insulation) may be displayed, at 170*c*, along with the pricing, which may be specific to that store or based on regional pricing. To view other retailer options, the user may select a "back" prompt to return to the locate retailer screen.

Figure 9:
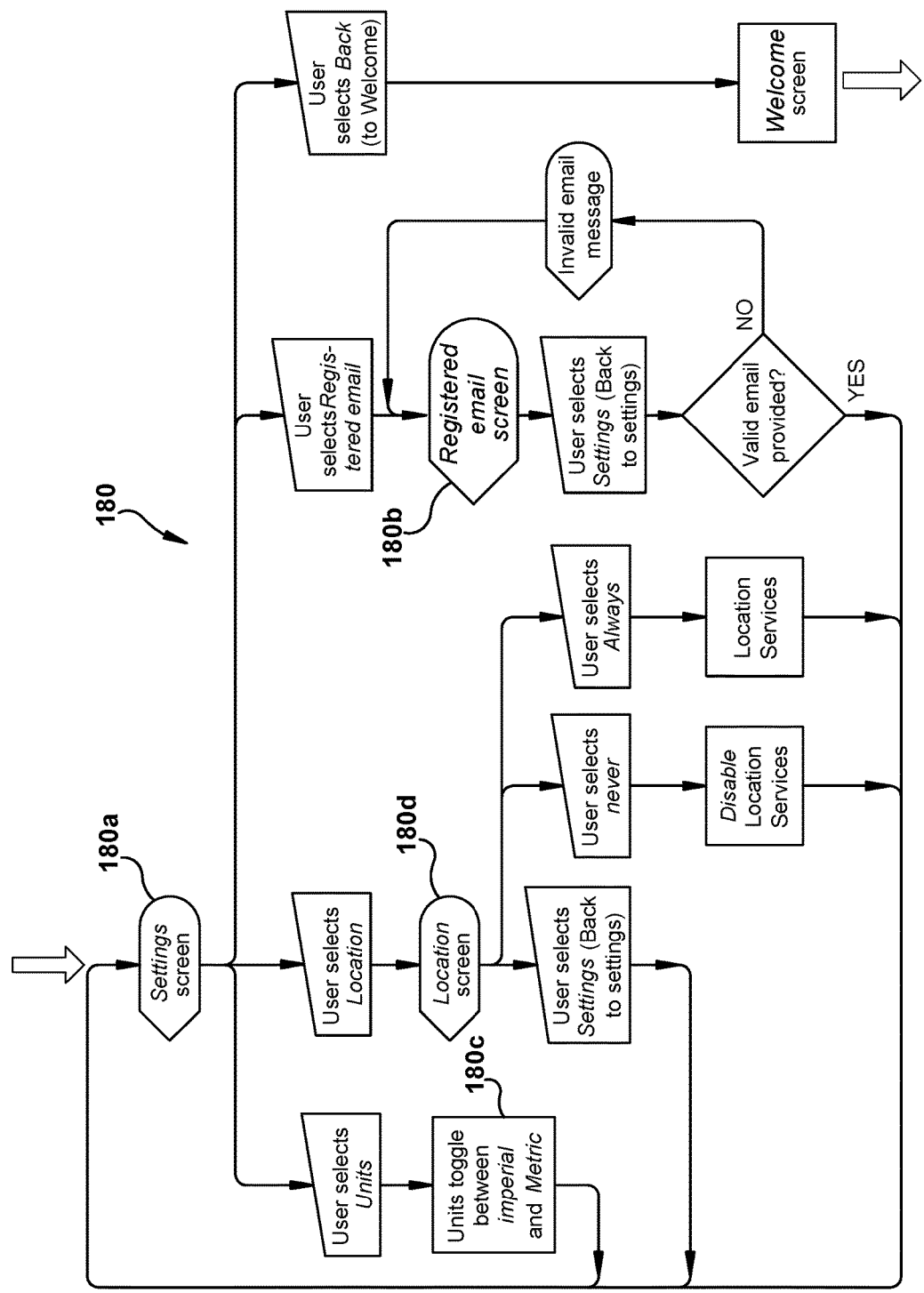
FIG. 9 is a flow diagram of an exemplary settings module for the insulation audit application tool of FIG. 1.
Figure 10:
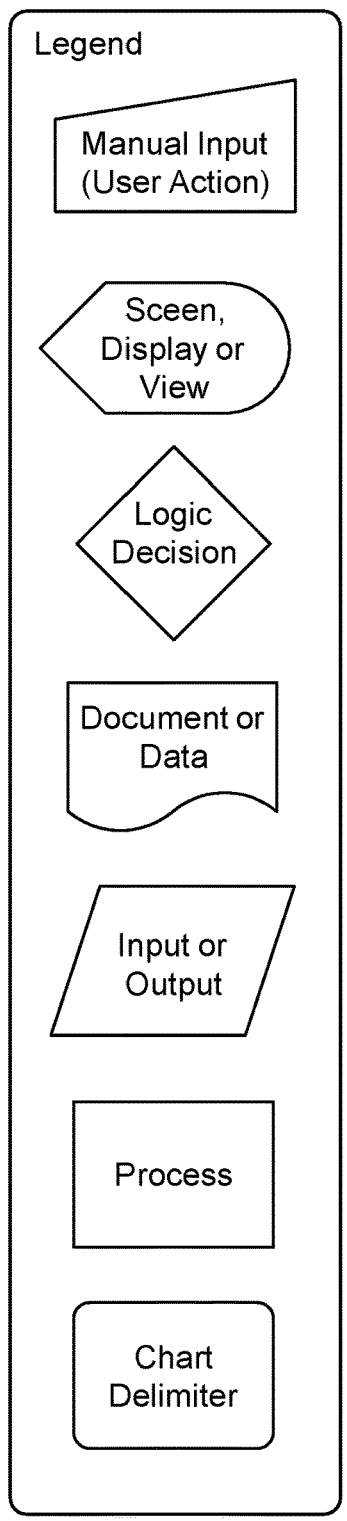
FIG. 10 illustrates a legend for the flow diagrams of FIGS. 2-9.

Settings:

The application tool may provide for one or more user selectable settings. FIG. 9 illustrates the steps employed by an exemplary settings module 180. When the settings option is selected from the welcome screen menu 120, the settings screen 180*a* presents options allowing the user to change their registered e-mail address, units settings (imperial/metric), and view the terms and conditions and data collection agreements. Selection of the "registered e-mail" option results in the display of a registered e-mail screen, at 180*b*, which displays the user's currently registered e-mail, and allows the e-mail to be changed (e.g., by using a standard iOS pop-up keyboard). Selection of the "units" option provides for toggling between imperial and metric units, at 180*c*. Selection of the "location" option allows the user to select "never" to disable location services or "always" to enable location services, at 180*d*. Still other setting may be modified.

According to another aspect of the present application, different versions of the application tool may be provided to DIY users (a "DIY version") and professional contractor users (a "PRO version"). For example, the DIY version may be simplified for ease of use, while the PRO version may provide for additional, more complex options. As one example, the DIY version may be limited to a single audit report, with the PRO version allowing for storage of multiple audit reports. As another example, the PRO version of the application tool may allow the user to jump directly into a thermal scan mode with a single tap (or touchscreen prompt) for live demonstrations.

The above description of specific embodiments has been given by way of example. From the disclosure given, those skilled in the art will not only understand the general inventive concepts and attendant advantages, but will also find apparent various changes and modifications to the structures and methods disclosed. For example, the general inventive concepts are not typically limited to any particular application or damper configuration. Thus, for example, use of the inventive concepts on all types of devices needing vibration and/or sound deadening, are within the spirit and scope of the general inventive concepts. As another example, although the embodiments disclosed herein have been primarily directed to a dryer, the general inventive concepts could be readily extended to any application which could benefit from the damper configurations disclosed herein. It is sought, therefore, to cover all such changes and modifications as fall within the spirit and scope of the general inventive concepts, as described and claimed herein, and equivalents thereof.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Still further, while specifically shaped features have been shown and described herein, other geometries can be used including elliptical, polygonal (e.g., square, rectangular, triangular, hexagonal, etc.) and other shapes can also be used. Therefore, the invention, in its broader aspects, is not limited to the specific details, the representative apparatus, and illustrative examples shown and described. Accordingly, departures can be made from such details without departing from the spirit or scope of the applicant's general inventive concept.

We claim:

1. A system for evaluating building insulation, the system comprising:
 a thermal scanning device configured to record thermal data for one or more leak path features at one or more building locations; and
 a computing device in communication with the thermal scanning device for receiving the thermal data, the computing device being configured to determine an environmental temperature deviation between an estimated inside temperature and an estimated outside temperature, wherein the computing device, in response to receipt from the thermal scanning device of first thermal data for a first leak path feature at a first building location:
  determines a first leak temperature deviation between the first leak temperature reading and the estimated inside temperature,
  compares a first temperature deviation ratio of the first leak temperature deviation to the environmental temperature deviation with a predetermined first maximum acceptable inefficiency ratio; and
  provides a first user notification identifying the first leak path feature and indicating whether the first temperature deviation ratio is greater than the first maximum acceptable inefficiency ratio.

2. The system of claim 1, wherein when the first temperature deviation ratio is greater than the first maximum acceptable inefficiency ratio, the first user notification includes at least one of recommended building material products for remediation of the first leak path feature, price of the recommended building material products, a retail location for the recommended building material products, and a level of difficulty of the remediation of the first leak path feature.

3. The system of claim 1, wherein the computing device comprises a mobile device, and the thermal scanning device is attachable to the mobile device.

4. The system of claim 1, wherein the computing device, in response to receipt from the thermal scanning device of second thermal data for a second leak path feature at a second building location:
 determines a second leak temperature deviation between the second leak temperature reading and the estimated inside temperature,
 compares a second temperature deviation ratio of the second leak temperature deviation to the environmental temperature deviation with a predetermined second maximum acceptable inefficiency ratio; and
 provides a second user notification identifying the second leak path feature and indicating whether the second temperature deviation ratio is greater than the second maximum acceptable inefficiency ratio.

5. The system of claim 4, wherein the computing device, in response to the receipt of the first and second thermal data, calculates a first leak remediation impact rating for the first leak path feature based on at least one of leak path type and deviation of the first temperature deviation ratio from the first maximum acceptable inefficiency ratio, and calculates a second leak remediation impact rating for the second leak path feature based on at least one of leak path type and deviation of the second temperature deviation ratio from the second maximum acceptable inefficiency ratio, wherein the computing device provides the first and second user notifications in a prioritized list based on the first and second leak remediation impact ratings.

6. A method for evaluating building insulation of a building, the method comprising:
  receiving at a computing device first thermal data for a first building location from a thermal scanning device in communication with the computing device, the first thermal data including a first leak temperature reading of a first leak path feature at the first building location;
  storing a first estimated inside temperature and an estimated outside temperature in the computing device, and determining a first environmental temperature deviation between the first estimated inside temperature and the estimated outside temperature;
  determining a first leak temperature deviation between the first leak temperature reading and the estimated inside temperature;
  comparing a first temperature deviation ratio of the first leak temperature deviation to the environmental temperature deviation with a predetermined first maximum acceptable inefficiency ratio; and
  providing a first user notification identifying the first leak path feature and indicating whether the first temperature deviation ratio is greater than the first maximum acceptable inefficiency ratio.

7. The method of claim 6, wherein providing the first user notification comprises providing a location of the first leak path feature, recommended building material products for remediation of the first leak path feature, price of the recommended building material products, and a level of difficulty of the remediation of the first leak path feature.

8. The method of claim 7, wherein providing the first user notification comprises displaying the first user notification on the computing device.

9. The method of claim 6, wherein receiving the first thermal data from the thermal scanning device comprises receiving a first thermal image of the first building location.

10. The method of claim 9, wherein storing the estimated inside temperature comprises calculating an average temperature of the first thermal image.

11. The method of claim 6, wherein storing the estimated inside temperature comprises receiving a plurality of thermal images of the building and calculating an average temperature of the plurality of thermal images.

12. The method of claim 6, wherein storing the estimated outside temperature comprises communicating with a web-based service to obtain a temperature of a geographic location of the computing device.

13. The method of claim 6, wherein storing the estimated outside temperature comprises receiving manual user entry of an estimated outside temperature.

14. The method of claim 6, further comprising generating an alert if the environmental temperature deviation is less than a predetermined amount considered sufficient to recognize a significant thermal leak path.

15. The method of claim 6, further comprising identifying the first leak path feature as one of a plurality of leak path types, wherein the first predetermined acceptable inefficiency ratio is specific to the identified leak path type.

16. The method of claim 15, wherein the plurality of leak path types includes a window, a wall, a door, and a ceiling.

17. The method of claim 6, further comprising:
  receiving at the computing device second thermal data for a second building location from the thermal scanning device, the second thermal data including a second leak temperature reading of a second leak path feature at the second building location;
  determining a second leak temperature deviation between the second leak temperature reading and the estimated inside temperature;
  comparing a second temperature deviation ratio of the second leak temperature deviation to the environmental temperature deviation with a predetermined second maximum acceptable inefficiency ratio; and
  providing a second user notification if the second temperature deviation ratio is greater than the second maximum acceptable inefficiency ratio.

18. The method of claim 17, wherein receiving the first and second thermal data from the thermal scanning device comprises receiving a first thermal image of the first and second building locations.

19. The method of claim 17, wherein receiving the first thermal data from the thermal scanning device comprises receiving a first thermal image of the first building location and receiving the second thermal data from the thermal scanning device comprises receiving a second thermal image of the second building location.

20. The method of claim 17, further comprising calculating a first leak remediation impact rating for the first leak path feature based on at least one of leak path type and deviation of the first temperature deviation ratio from the first maximum acceptable inefficiency ratio, and calculating a second leak remediation impact rating for the second leak path feature based on at least one of leak path type and deviation of the second temperature deviation ratio from the second maximum acceptable inefficiency ratio, wherein providing the first and second user notifications comprises providing a prioritized list of the first and second user notifications based on the first and second leak remediation impact ratings.

* * * * *